United States Patent [19]

Komeya et al.

[11] Patent Number: 4,879,263

[45] Date of Patent: Nov. 7, 1989

[54] SLIDING MEMBER OF HIGH STRENGTH AND HIGH ABRASION RESISTANCE

[75] Inventors: Katsutoshi Komeya, Kanagawa; Hashimoto, Masahiro, Kamakura; Katsutoshi Nishida; Michiyasu Komatsu, both of Yokohama, all of Japan

[73] Assignee: Kabushiki Kaisha Toshiba, Kawasaki, Japan

[21] Appl. No.: 776,836

[22] Filed: Sep. 17, 1985

[30] Foreign Application Priority Data

Sep. 18, 1984 [JP] Japan .................................. 59-194990

[51] Int. Cl.[4] ............................................. C04B 35/56
[52] U.S. Cl. ........................................ 501/97; 501/98; 501/105; 501/108; 501/127; 264/65; 264/125; 264/332
[58] Field of Search ................... 501/97, 98, 103, 104, 501/105, 126, 127; 264/65, 125, 332

[56] References Cited

U.S. PATENT DOCUMENTS

| | | |
|---|---|---|
| 4,124,402 | 11/1978 | Greskovich et al. |
| 4,327,187 | 4/1982 | Komatsu et al. ........................ 501/97 |
| 4,407,970 | 10/1983 | Komatsu et al. ........................ 501/97 |
| 4,440,707 | 4/1984 | Shimamori et al. .................... 264/65 |
| 4,499,192 | 2/1985 | Shimamori et al. .................... 501/97 |
| 4,560,669 | 12/1985 | Matsuhiro et al. ..................... 501/97 |
| 4,563,433 | 1/1986 | Yeckley et al. ........................ 501/97 |

FOREIGN PATENT DOCUMENTS 0124989 11/1984 European Pat. Off.
2063302 6/1981 United Kingdom.

OTHER PUBLICATIONS

838 American Ceramic Society Bulletin, vol. 60 (1981) Dec., No. 12, Columbus, Ohio, U.S.A., "Sintering Behavior and Microstructural Development of Yttrium-Doped Reaction-Bonded Silicon Nitride," pp. 1306-1310., Mangels et al.

838 American Ceramic Society Bulletin, vol. 62 (1983) Dec., No. 12, Columbus, Ohio, U.S.A., "Fabrication and Properties of Dense Polyphase Silicon Nitride," pp. 1369-1374.

European Patent Office, Search Report, Mar. 25, (1987).

*Primary Examiner*—Stephen J. Lechert, Jr.
*Attorney, Agent, or Firm*—Finnegan, Henderson, Farabow, Garrett and Dunner

[57] ABSTRACT

A sliding member formed of sintered silicon nitride shows improvement in strength and abrasion resistance when substantially all the β-phase type fine silicon nitride particles present as a main component in the sintered silicon nitride have major diameters not exceeding 60 μm and aspect ratios of not less than 5 and the aforementioned fine silicon nitride particles have a relative density of not less than 98%.

5 Claims, 1 Drawing Sheet

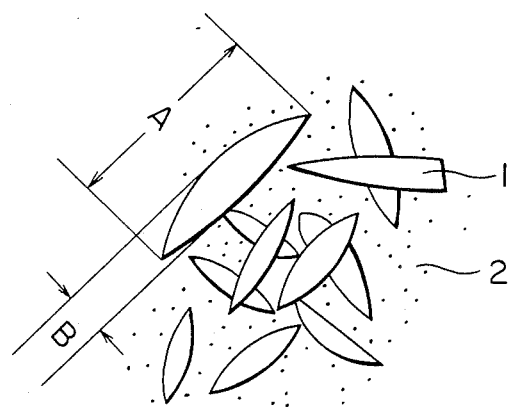

SLIDING MEMBER OF HIGH STRENGTH AND HIGH ABRASION RESISTANCE

BACKGROUND OF THE INVENTION

1. Field of the Invention

This invention relates to a sliding member of high strength and high abrasion resistance, and more particularly to a dense sliding member of high strength and high abrasion resistance having as a principal component thereof fine elongated silicon nitride particles.

2. Description of the Prior Art

In the conventional sliding members such as bearing materials destined to be used in zones of elevated temperatures, there are included sliding members which are formed of sintered silicon nitride.

These sliding members are such that their properties such as strength and abrasion resistance depend on the strength and abrasion resistance possessed by the sintered silicon nitride. The abrasion resistance is easily affected by the surface roughness of silicon nitride and the presence of pores therein. Thus, it has been difficult to obtain a sintered article of silicon nitride combining high strength and satisfactory abrasion resistance.

Particularly when a sliding member is used in a dry state, the conditions under which it is used are harsh. Thus, it has been very difficult to obtain a sliding member which can be used effectively under such working conditions.

The inventors continued a devoted study in search of means of enhancing the strength and abrasion resistance of a sliding member formed with sintered silicon nitride. They have consequently found that a sliding member combining high strength and high abrasion resistance is obtained when the fine silicon nitride particles present as a main component in the sintered article of elongated silicon nitride

SUMMARY OF THE INVENTION

A major object of this invention is to provide a sliding member of high strength and high abrasion resistance which is formed of sintered silicon nitride.

The other objects of this invention will become apparent from the following description.

BRIEF DESCRIPTION OF THE DRAWING

The drawing is a plan view illustrating, as magnified, fine silicon nitride particles and a grain boundary phase of a sliding member of high strength and high abrasion resistance of this invention.

DESCRIPTION OF THE PREFERRED EMBODIMENT

FIG. 1 illustrates components of a sliding member of high strength and high abrasion resistance of this invention, as magnified. In the diagram, the symbol 1 denotes a β-phase fine silicon nitride particle and the symbol 2 a grain boundary phase.

In the present invention, substantially all, of the β-phase fine silicon nitride particles 1 resemble long sticks and have aspect rations, i.e. ratios of major diameter A to minor diameter B, of not less than 5.

The fine silicon nitride particles are formed of β-phase silicon nitride. Further, the grain boundary phase accounts for not more than 20% by weight, preferably 1 to 10% by weight, of the entire amount of the composition of the sliding member. The relative density of the entire composition is not less than 98%.

Here, the relative density (D) is calculated by the following equation.

$$D = (\delta/\delta th)$$

wherein,

δ: measured density (g/cc) and
δth: theoretical density (g/cc).

The factors mentioned above are not tolerated to deviate from the aforementioned ranges, because any deviation results in decrease of strength and lowering of abrasion resistance.

The grain boundary phase in the sliding member of high strength and high abrasion resistance of the present invention is desired to contain therein the oxide of a rare earth element such as yttrium oxide together with aluminum oxide.

The sliding member of high strength and high abrasion resistance of the foregoing description is produced by the following method.

This sliding member of high strength and high abrasion resistance is produced by mixing not more than 10% by weight of the oxide of a rare earth element, not more than 10% by weight, preferably 3 to 15% by weight in an amount in combination with the oxide of a rare earth element of aluminum oxide, not more than 10% by weight preferably 2 to 15% by weight in an amount combined with the aluminum oxide of aluminum nitride, and not more than 5% by weight, preferably 0.05 to 3% by weight, of titanium oxide, zirconium oxide or magnesium oxide, (excluding the case wherein the oxide of a rare earth element and aluminum oxide both account for 0% by weight) with silicon nitride powder in such proportions that the ratio of the oxide of a rare earth metal to aluminum oxide will fall in the range of 0.5 to 10, and when aluminum nitride is contained, the ratio of aluminum nitride to aluminum oxide will fall in the range of 0.1 to 5, and sintering the resultant mixture in an atmosphere of inert gas at a temperature in the range of 1,650° to 1,850° C.

The sintered article thus obtained is consisting of elongated particles a ceramic matrix, resulting in attainment of high strength. At the time, the aspect ratio of the long stick-like particles is desired to be not less than 5 and the particles are desired to have major diameters (lengths of A indicated in the diagram) of not more than 60 μm, preferably not more than 30 μm.

Among the oxides of rare earth elements, yttrium oxide is particularly desirable. The silicon nitride powder to be used for this purpose is desired to be of αtype which is obtained by reducing $SiO_2$ in the presence of nitrogen.

In the composition described above, the oxide of a rare earth element, aluminum oxide, aluminum nitride, and titanium oxide invariably function to accelerate the sintering of the mixture. If any of the amounts of these components exceeds the foresaid upper limit, then the produced sliding member of high strengh and high abrasion resistance loses mechanical strength and thermal shock resistance.

The ratio of the oxide of a rare earth element to aluminum oxide is suitable to be in the range of 0.5 to 10. When the composition includes aluminum nitride, the ratio of aluminum nitride to aluminum oxide is desired to fall in the range of 0.1 to 5. If any of these ratios exceeds the upper limit of the relevant range, there ensues the disadvantage that the aspect ratio of the fine silicon nitride particles is less than 5.

Properly, the sintering the mixture is carried out at a temperature in the range of 1,650° to 1,850° C. Any deviation of the sintering temperature from this range proves undesirable because the formation of β-phase type fine silicon nitride particles is attained with great difficulty. The atmosphere in which the mixture is sintered is desired to be an atmosphere of inert gas. If this atmosphere is formed of an oxidative gas, silicon nitride is oxidized into silicon oxide at elevated temperatures, rendering desired production of a sliding member of high strength and high abrasion resistance infeasible. The sintering of the mixture can be carried out in an furnance under atmospheric pressure, in an atmosphere of pressurized gas, or with a hot press. The sintered mixture acquires the most desirable properties when it has been treated with the hot press. When the sintered article is further treated with a hot isostatic press (HIP), it gains notably in relative density.

Now, the present invention will be described below with reference to a working example.

EXAMPLE

Silicon nitride powder containing 85% of β-phase type silicon nitride and having an average particle size of 1.2 μm, yttrium oxide powder having an average particle size of 1 μm, aluminum oxide powder having an average particle size of 0.5 μm, aluminum nitride powder having an average particle size of 1.5 μm, and titanium oxide powder having an average particle size of 1 μm were mixed in a varying composition ratio (% by weight) indicated in the following table and kneaded in a ball mill for 10 hours, to produce a raw material powder.

The raw material powder so prepared and 7% by weight, based on the powder, of an organic binder added thereto were blended. The resultant mixture was molded under pressure of 700 kg/cm² to produce a molded piece 60 mm in length 40 mm in width, and 10 mm in thickness. This molded piece was set in place under an atmosphere of nitrogen gas, heated at 1,550° C., and further sintered at 1,700° C. under an atmosphere of nitrogen gas under atmospheric pressure for two hours, to afford a sintered article of silicon nitride ceramic.

The sintered article of ceramic of this invention so produced had not more than 20% by weight of the particle boundary phase. This sintered article was tested for bending strength after 1,000 hour oxidation at room temperature and 1,300° C. The samples were tested for abrasion resistance in a combination of each sintered article of ceramic by the use of an Amsler testing machine. The values of composition strength were obtained by the three-point bending strength test, using samples 3 mm×3 mm ×40 mm under the conditions of cross head speed of 0.5 mm/min. and a span of 20 mm.

The sample which had undergone the bending test and sustained fracture had their fracture surfaces examined under a scanning electron microscope, to determine the shape of silicon nitride particles and the condition of grain boundary phase in the fracture surface. The results are shown in the following table.

TABLE

| Run NO. | | 1 | 2 | 3 | 4 | 5 | 6 | 7 | 8 |
|---|---|---|---|---|---|---|---|---|---|
| Composition (% by weight) | $Y_2O_3$ | 3 | 10 | 6 | 5 | 5 | 6 | 2 | 11 |
| | $Al_2O_3$ | 5 | 2 | 5 | 2 | 2 | 5 | 10 | 1 |
| | AlN | | | 3 | 4 | | 1 | | 1 |
| | $TiO_2$ | | | | | 5 | 2 | | |
| Relative density (%) | | >98 | >98 | >98 | >98 | >98 | >98 | 97 | 84 |
| Presence or absence of grain boundary phase | | No | Yes | Yes | Yes | No | No | No | Yes |
| Aspect ratio of $Si_3N_4$ particles | | 6~10 | 10~24 | 6~18 | 7~20 | 7~18 | 7~15 | 4 | 10~25 |
| Major diameter of $Si_3N_4$ particles (μm) | | 5~20 | 10~30 | 5~20 | 2~15 | 5~20 | 5~20 | — | 60~100 |
| bending strength (kg/mm2) | | 90 | 95 | 100 | 110 | 93 | 102 | 84 | 56 |
| Specific abrasion (mm³/kg f.mm) | | >10⁻⁸ | >10⁻⁸ | >10⁻⁸ | >10⁻⁸ | >10⁻⁸ | >10⁻⁸ | 5 × 10⁻⁷ | 1 × 10⁻⁷ |

In the table, Run No. 7 and Run No. 8 are comparative experiments.

It is noted from the table given above that the sliding member of high strength and high abrasion resistance according to this invention acquires outstanding strength and abrasion resistance even by sintering under atmospheric pressure.

What is claimed is :

1. A sliding member of high strength and high abrasion resistance, preponderantly comprising elongated particles of β-phase silicon nitride and not more than 20% by weight, based on the total amount of said sliding member, of a matrix phase enveloping said silicon nitride particles, said particles having major diameters of not more than 60 μm and aspect ratios of not less than 5, said sliding member having a relative density of not less than 98%, and said sliding member consisting essentially of silicon nitride and effective amounts of an oxide of a rare earth element, aluminum oxide and a member selected from the group consisting of titanium oxide, zirconium oxide and magnesium oxide, said sliding member formed by mixing not more than 10% by weight of the oxide of a rare earth element, not more than 10% by weight of aluminum oxide, not more than 5% by weight of at least one member selected from the group consisting of titanium oxide, zirconium oxide and magnesium oxide, (excluding the case wherein both said oxide of rare earth and aluminum oxide both account for 0% by weight) with silicon nitride powder in proportions such that the ratio of said oxide of rare earth element to aluminum oxide will fall in the range of 0.5 to 10, and sintering the resultant mixture.

2. The sliding member of claim 1, wherein said oxide of said rare earth is yttrium oxide.

3. The sliding member of claim 1, wherein the total amount of said oxide of said rare earth element with aluminum oxide to be added comprises from about 3 to 15% by weight of the amount of other materials.

4. The sliding member of claim 1, wherein the total amount of silicon nitride with aluminum oxide to be added is from about 2 to 15% by weight of the amount of other materials.

5. The sliding member of claim 1, wherein the total amount of titanium oxide, zirconium oxide and magnesium oxide to be added is from about 0.05 to 3% by weight of the amount of other materials.

* * * * *